United States Patent [19]

Mittleman et al.

[11] 4,191,461
[45] Mar. 4, 1980

[54] CAMERA JIG FOR UNDERWATER STEREOSCOPIC PHOTOGRAPHY

[75] Inventors: John Mittleman; Charles O. Warrell, both of Panama City; Ronald S. Peterson, Panama City Beach, all of Fla.

[73] Assignee: The United States of America as represented by the Secretary of the Navy, Washington, D.C.

[21] Appl. No.: 39,990

[22] Filed: May 16, 1979

[51] Int. Cl.² ............................................ G03B 17/08
[52] U.S. Cl. ...................................... 354/64; 354/294
[58] Field of Search .................. 354/64, 294, 293, 81, 354/82, 112; 358/99; 350/319

[56] References Cited

U.S. PATENT DOCUMENTS

| 631,222 | 8/1899 | Mason . | |
|---|---|---|---|
| 713,177 | 11/1902 | Thomsen . | |
| 2,396,267 | 3/1946 | Johnson . | |
| 2,400,455 | 5/1946 | Donaldson . | |
| 2,478,842 | 8/1949 | Schwartz et al. . | |
| 2,860,562 | 11/1958 | Swift . | |
| 3,550,519 | 12/1970 | Lewis | 354/293 |
| 3,838,434 | 9/1974 | Hughes et al. | 354/64 |
| 4,008,606 | 2/1977 | Talkington | 73/104 |

*Primary Examiner*—John Gonzales
*Attorney, Agent, or Firm*—Richard S. Sciascia; Harvey A. David

[57] ABSTRACT

A portable camera jig for use by divers in making close-up, stereoscopic photographs of underwater surfaces with a single lens camera includes, in combination with a sheet metal frame, a clear water box for operation in turbid water and that will permit illumination and operator viewing of the surface to be photographed, a camera support and parallogram linkage for moving the camera laterally between successive exposures, a light source mounted on a mast, and handles by which an individual diver can position the jig and shift the camera.

10 Claims, 4 Drawing Figures

CAMERA JIG FOR UNDERWATER STEREOSCOPIC PHOTOGRAPHY

BACKGROUND OF THE INVENTION

This invention relates to underwater photography, and more particularly to an improved underwater camera jig for use in taking stereoscopic photographs of underwater surfaces for use in analyzing the extent and character of marine growth on the surface, condition of surface coatings, and degree of pitting of hull plates, and the like.

Underwater photography has long been used as a valuable tool in determining the condition of underwater surfaces of ship hulls, bridges, piers, and other underwater structures. U.S. Pat. No. 631,222 to D. Mason provides an early example of photographic apparatus for such purposes. Commercially available portable underwater cameras and light sources that can be carried by free swimming divers have resulted in more widespread use of underwater photography.

Close-up photography, in particular, requires accurate lens to object distance control in order to assure proper focus and underwater photography, in general, can be severely hampered by turbid water conditions. Accurate distances to surfaces or objects being photographed underwater with close-up lenses is usually attained by means of a stand-off frame or bracket formed of heavy wire and attached to the camera, while the problem of turbid water has been approached by providing a clear water chamber between the camera lens and the object to be photographed, or through use of apparatus including pumps, hoses, and the like for displacing turbid water with a flow of clear water. U.S. Pat. No. 2,396,267 to E. R. F. Johnson provides examples of those expedients. Such devices as have been available, however, have been unweildy for a free swimming diver to manage, and hence the extent of use has been limited.

While conventional single image photographs can convey a great deal of visual information about the condition of an underwater surface, they provide only two dimensional views of objects and conditions that are three-dimensional in character and are significantly related, for example, to problems of fuel consumption of, and structural failures in ships.

This has been recognized in U.S. Pat. No. 4,008,606 to H. R. Talkington, wherein the hull surface to be photographed is illuminated by light falling at a predetermined angle so that shadows will be cast by discontinuities on or in the hull surface. While some information is gained in this manner as to size, other information is lost in the shadows.

Through the use of the present invention, it has been found that stereoscopic, or dual image, photographs can provide considerably more information concerning the extent and height of marine growth, size and depth of pitting of metal plates, degree of blister development in coatings, and the like. Now, stereoscopic measurements and interpretations require the making of dual photographic images with a great deal of precision, particularly as to the inter-lens distance as well as to the lens to object distance. Although stereoscopic cameras are available having spaced lenses for taking the dual images simultaneously of objects or scenes above water, and devices are known for using a conventional single lens camera for taking the dual images successively to make stereoscopic photographs in air, none of those devices, however, are suitable for conveniently carrying out close-up stereoscopic photography underwater, with turbid conditions, by free swimming divers.

SUMMARY OF THE INVENTION

With the foregoing in mind, it is a principal object of this invention to provide a stereoscopic camera jig for underwater use in making close-up, dual image or stereoscopic photographs from which measurements can readily be taken in three dimensions.

Another object of this invention is to provide a light weight, portable, and easily handled jig for use with a conventional, single lens, underwater camera, by an unaided free swimming diver.

Yet another object is the provision of stereoscopic jig, for underwater cameras, that includes a clear water chamber that serves also as a user viewing chamber and as at least part of a lens-to-object distance determining stand-off for close-up stereoscopic photography.

Still another object is the provision of a camera jig of the foregoing character that is inexpensive to manufacture, reliable and repeatable in accuracy, and can be operated with a minimum of specialized training.

The invention may further be said to reside in certain novel constructions, combinations, and arrangements of parts by which the foregoing objects and advantages are achieved together with other objects and advantages which will be made apparent from the following detailed description when read in conjunction with the accompanying drawings.

DESCRIPTION OF THE PREFERRED EMBODIMENT

Figure 1:
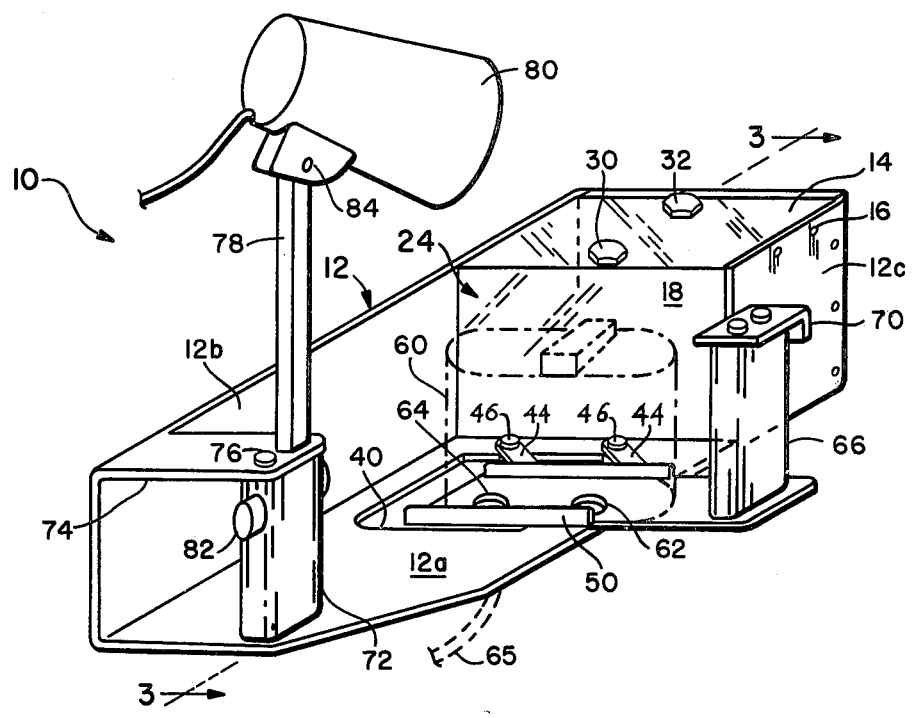
FIG. 1 is a perspective view illustrating a camera jig device embodying the invention for making close-up underwater stereoscopic photographs, with a camera shown in phantom.

Referring to FIG. 1, stereoscopic, underwater camera jig device embodying the invention is indicated generally at 10 and comprises a formed sheet metal frame 12, preferably of aluminum or stainless steel. The frame 12 comprises a plane base or bottom wall 12a, having three right angled corners and two substantially 135° corners. Thus, the bottom wall may be regarded as generally rectangular with one corner cut off so as to present longer and shorter parallel side edges. A first, generally rectangular, side wall 12b extends upwardly from said bottom wall 12a along the longer side edge thereof. A shorter, second side wall 12c extends upwardly from said bottom wall 12a along a portion of the shorter edge of the bottom wall 12a, and parallel to and spaced from a corresponding portion of the side wall 12b.

Fixed between the upper edges of the side walls 12b and 12c, and in spaced parallel relation to the bottom wall 12a, is a rectangular top or upper plate 14 of rigid transparent material such as is sold under the trade name "LEXAN". Screws 16 conveniently are used to secure the transparent plate or wall 14 to the frame side walls 12b and 12c. A pair of additional rectangular, transparent plates 18 and 20 are disposed in spaced parallel relation to one another and normal to the bottom wall 12a and to the transparent plate 14. The plates 18 and 20, which may be regarded as rear and front plates, respectively, are secured to the bottom wall and to the transparent top plate 14, as by additional screws 22, so as to form therewith a watertight box, indicated generally at 24. A protective strip 26 and a spacer strip 28 are conveniently fixed along the front upper edge of the box 24 by the screws along that edge. The upper transparent plate 14 of the box 24 is provided with a pair of openings normally closed by threaded plugs 30,32 which can be removed to permit filling of the box 24 with a transparent, substantially incompressible liquid, such as clear water 34.

The bottom wall 12a of the frame 12 has a substantially rectangular cut-out or opening 40 therein adjacent the rear transparent plate 18 of the box 24. At the front edge of the opening 40, that is the edge nearest the plate 18, a pair of laterally spaced, apertured ears 42 project into the opening and serve as pivot supports for the forward ends of a pair of parallelogram links 44. The links, which are of equal length, 44 are conveniently pivoted to the ears 42 by bolts 46.

Movably carried by the rearward ends of the pair of links 44 is a channel shaped camera support 50. To this end a plate 52, conveniently welded to the underside of the support 50, has a pair of laterally spaced, apertured ears 54, pivotally connected to the links 44 by bolts 56. The camera support 50 is adapted to carry a commercially available underwater camera 60 of conventional construction normally used for taking independent or non-stereoscopic photographs. A camera found suitable for use in combination with the device 10 is the "Nikonos" underwater camera of Nikon, Inc., Gorden City, New York.

The camera support 50 is provided with openings 62,64 for use in securing the camera to the support, as by a screw (not shown) and for passing a cable 65 for synchronizing camera operation with a photo-flash light. Thus, at least one of the openings 64 is in overlying relation to the opening 40 in the frame wall 12a. When the camera 60 is so mounted on the support 50, its lens tube 60a projects toward the box 24 so as to "look" through the transparent plates 18 and 20 thereof and through the clear liquid therebetween.

Figure 2:
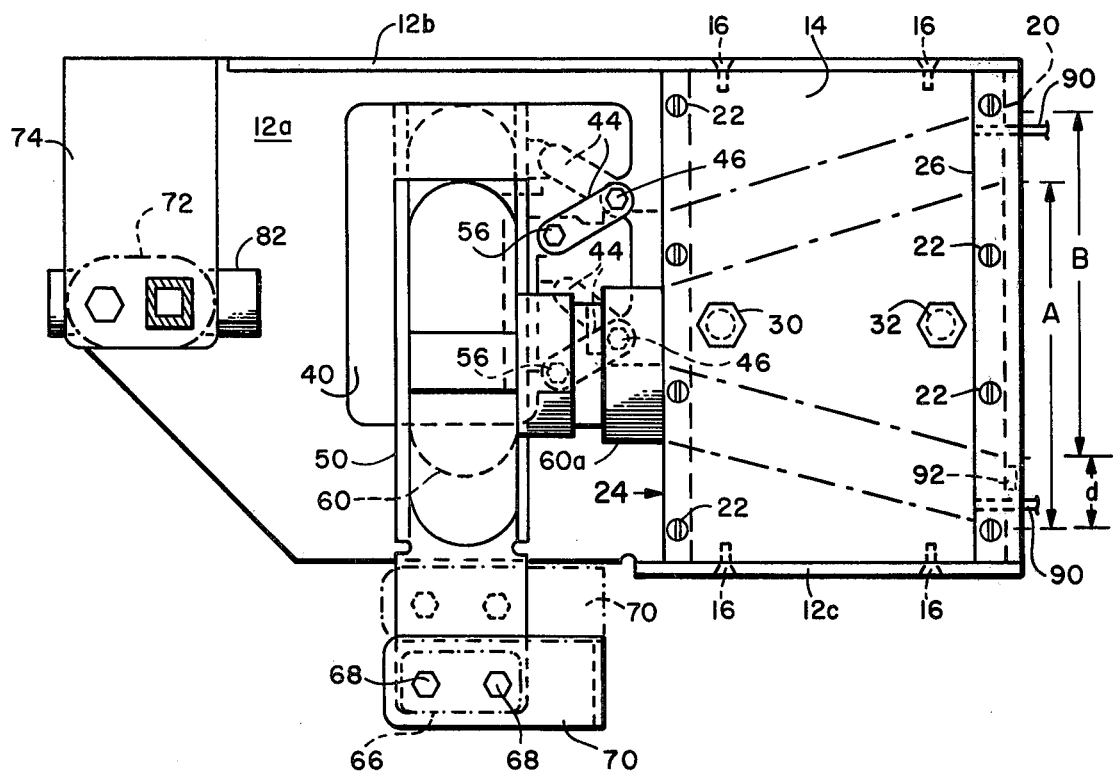
FIG. 2 is a plan view of the device of FIG. 1, in association with the camera and various parts illustrated in various positions of use.

The camera 60 and its support 50, by virtue of the parallelogram links 44 between the frame 12 and the support, is laterally shiftable between two predetermined positions in which the lens tube 60a engaged the rear transparent plate 18 as a stop. These two positions are illustrated in full and broken lines, respectively, in FIG. 2. Movement of the camera support 50 and hence the camera 60 between those two positions is effected manually by an operating handle 66 that extends vertically from one end of the support 50 that extends beyond the shorter side of the frame 12. The handle 66 is secured to the support by screws 68 and is provided at its upper end with a hook shaped guard 70 that acts to prevent slippage of the handle from a diver operator's hand.

Mounted on the frame 12 at the rear end of the device 10 is a handle or hand grip 72 that extends vertically between the bottom frame wall 12a and a brace member 74 that extends from the upper edge of the frame side wall 12b, and is conveniently formed integrally therewith. A through bolt 76 fixes the hand grip 72 to the frame and brace member. The hand grip 72 is substantially aligned with the front to rear centerline of the device 10 and so as to allow the device to be held in position against a surface with one hand leaving the other hand free to operate handle 66 and the camera.

The brace member 74, the hand grip 72, and the frame wall 12a are provided with aligned square openings for receiving a mast 78 that supports an electric lamp 80. The grip 72 is further provided with a manually releasable detent device 82 for securing the mast 78, and its lamp 80, in selected positions of adjustment relative to the rest of the device 10. The lamp 80, which may be any of a number of commercially available underwater photo-flash lamps, is pivoted at 84 to the mast 78 and is adapted to direct its light output through the upper transparent plate 14 of the box 24, through the clear liquid 34 therein, and through the transparent front plate 20 so as to illuminate a surface to be photographed directly in front of the front plate.

At this point is should be noted that there are extending from the front plate 20a plurality of stand-off legs or pins 90 that serve to establish a space between a surface to be photographed and the front plate 20 to accommodate irregularities or protruding growths, such as barnacles or the like. The pins 90, together with the box 24, further establish a predetermined distance between the surface to be photographed and the camera lens.

Figure 3:
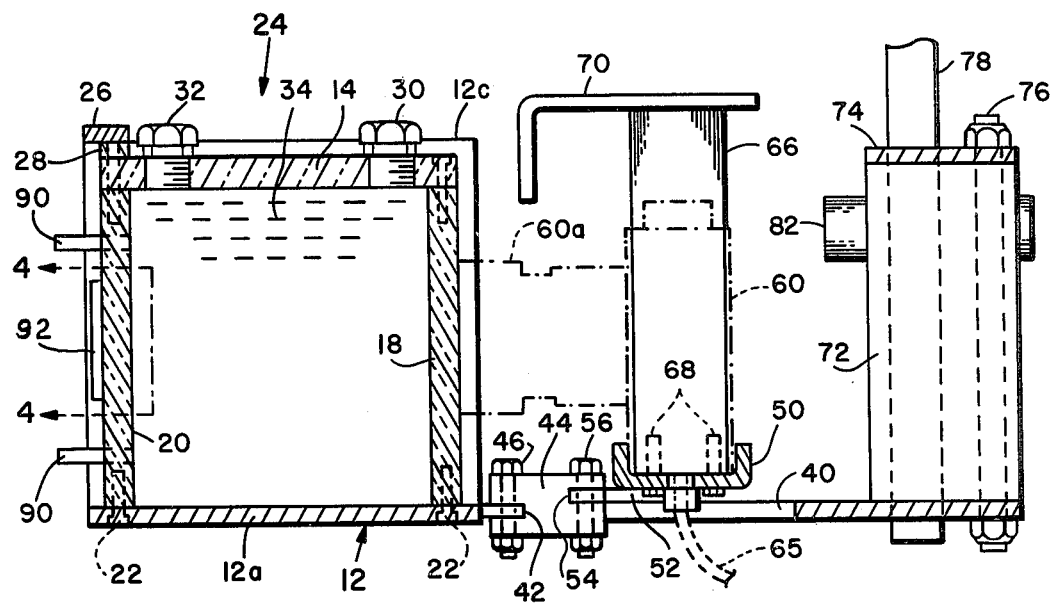
FIG. 3 is a sectional view of the device taken substantially along line 3—3 of FIG. 1.
Figure 4:
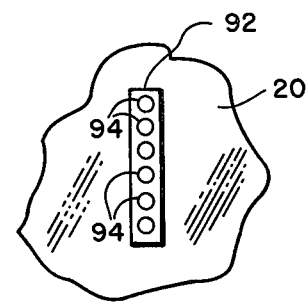
FIG. 4 is a fragmentary sectional view, taken substantially along line 4—4 of FIG. 3 and illustrating a color reference feature of the device.

Referring to FIGS. 3 and 4, the device 10 is provided with a color reference in the form of a clear plastic block or strip 92 having a plurality of discs 94 of different reference colors facing the camera. These reference colors in resulting photographs provide a means for determining the actual colors of photographed objects.

In operation, the device 10 is positioned by a diver to place the front transparent plate 20 over the surface to be stereoscopically photographed, with the stand-off pins 90 bearing on the surface. With the camera support 50 and camera 60 in their full line positions of FIG. 2, a first exposure is made having a lateral field of view A. The handle 66 is then operated to shift the support 50 and camera 60 through a predetermined lateral distance d to their broken line positions of FIG. 2 and a second exposure is taken having a field of view B. The shifting of the camera between the first and second positions is guided by the parallelogram links 44, and the distance d is accurately determined by the amount of swing of such links between engagements of the camera lens tube 46 with the rear plate 20 in the two camera positions.

The photographs resulting from the two exposures can later be examined and analyzed by known stereoscopic techniques to reveal much data regarding the three dimensional character of the surface condition of the area photographed.

Because of its light weight, rugged, and easily handled construction the stereoscopie, underwater camera jig device 10 produces excellent stereoscopic photographs even in the hands of divers having little or no previous photographic experience.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Apparatus for use in taking close-up underwater stereoscopic photographs, said apparatus comprising in combination:

a rigid frame including a base portion and having front and rear ends;

a fluid tight box disposed at said front end of said frame and comprising spaced front and rear transparent plates extending transversely of the front to rear central axis of said base portion;

a transparent liquid filling said box;

a camera support member extending transversely of said base portion rearwardly of said rear transparent plate;

an underwater camera, mounted on said support member, and looking through said rear transparent plate, said transparent liquid, and said front transparent plate;

connecting means, between said camera support and said base portion, for guiding lateral movement of said camera support member and said camera between first and second predetermined positions from which said camera has first and second fields of view laterally displaced from one another by said predetermined distance; and handle means for use in manually supporting said apparatus and for effecting said lateral movement of said camera support member and said camera between successive photographic exposures by said camera.

2. Apparatus as defined in claim 1, and further comprising:

stand-off means extending forwardly of said front transparent plate whereby said front plate is separated by a predetermined space from a surface to be photographed when said stand-off means are passed against said surface, whereby irregularities on said surface are accommodated.

3. Apparatus as defined in claim 2, and wherein:

said handle means comprises a first handle mounted at said rear end of said frame substantially on said central axis of said base portion, and a second handle mounted substantially at one end of said camera support member, whereby a user can hold said apparatus in position against said surface to be photographed with one hand on said first handle, and can operate said second handle with the other hand to effect said movement of said camera between successive photographic exposures.

4. Apparatus as defined in claim 3, and wherein:

said box comprises an upper transparent plate, parallel to said base portion, whereby a user can view the surface being photographed while said apparatus is positioned thereagainst.

5. Apparatus as defined in claim 4, and further comprising:

a mast extending upwardly from said frame; and
a light source mounted on said mast and adapted to direct light through said upper transparent plate, said transparent liquid, and said front transparent plate so as to illuminate said surface to be photographed.

6. Apparatus as defined in claim 5, and wherein said connecting means comprises:

a pair of spaced, parallel links each pivoted at one end to said base portion for swinging movement in a plane parallel thereto, and each pivoted at the opposite end to said camera support member, whereby said camera support member is maintained parallel to said rear transparent plate throughout its movements between said first and second positions.

7. A camera jig device for use in making close-up stereoscopic photographs of an underwater surface with a single lens camera, said device comprising:

an elongated frame formed of sheet metal and having a front end and a rear end, said frame being characterized by a main wall, a first side wall normal to said main wall and extending along a first side edge thereof from said front end to said rear end, a second side wall normal to said main wall and extending along a second side edge of said main wall and in spaced parallel relation to said first side wall;

a first transparent plate extending between said first and second side walls and extending normal to said main wall adjacent said front end of said frame;

a second transparent plate extending between said first and second side walls in spaced parallel relation to said first transparent plate;

a third transparent plate extending between first and second side walls and in spaced parallel relation to said main wall so as to form with said first and second transparent plates, said first and second side walls, and said main wall, a fluid tight box;

a body of transparent liquid filling said box;

means for positioning said first transparent plate in predetermined closely spaced relation to said surface to be photographed;

a channel shaped, camera support member extending transversely of said frame rearwardly of said box, said support member being adapted to support a camera having its lens tube aimed to view said surface to photographed through said first and second transparent plates and said transparent liquid;

means mounting said support member, and a camera supported thereon, to said frame for shifting movements between first and second, laterally spaced predetermined positions in which said camera has first and second fields of view, respectively, of said surface;

a light source;

a mast for supporting said light source relative to said frame so as to project light through said third and said first transparent plates of said box and through said transparent liquid for illumination of said surface;

a first handle having one end mounted on said main wall adjacent said rear end of said frame and substantially on the central longitudinal axis thereof for use in manually supporting and positioning said device relative to said surface; and a second handle mounted on said camera support member for manual operation of said camera support member and a camera thereon between said first and second predetermined positions.

8. A device as defined in claim 7, and wherein:

said frame further comprises strut means, extending from said first side wall to the other end of said first handle, whereby a closed handgrip is formed.

9. A device as defined in claim 8, and wherein:

said means mounting said support member to said frame comprises a parallelogram linkage having links that swing in a plane normal to the surface being photographed.

10. A device as defined in claim 9, and further comprising:

means cooperable between said camera support member and said frame for limiting said lateral shifting movements of said support member and said camera to a predetermined distance.

* * * * *